United States Patent [19]

Daudelin et al.

[11] Patent Number: 4,943,995
[45] Date of Patent: Jul. 24, 1990

[54] SEMI-AUTOMATED CUSTOMER INFORMATION SYSTEM

[75] Inventors: Abraham N. Daudelin, Colts Neck; Ronald J. Hartnett, Middletown; William A. O'Connell, Bricktown, all of N.J.

[73] Assignee: AT&T Bell Laboratories, Murray Hill, N.J.

[21] Appl. No.: 916,614

[22] Filed: Oct. 8, 1986

[51] Int. Cl.⁵ .................... H04M 3/58; H04M 3/50
[52] U.S. Cl. ........................ 379/67; 379/96; 379/112; 379/77; 379/84
[58] Field of Search .................... 379/70-74, 379/67, 84, 88, 89, 210, 212, 233, 213, 214

[56] References Cited

U.S. PATENT DOCUMENTS

| | | | |
|---|---|---|---|
| 2,922,847 | 1/1960 | Dunning | 179/27 |
| 3,989,901 | 11/1976 | Neuwirth et al. | |
| 4,071,698 | 1/1978 | Barger, Jr. et al. | 379/84 |
| 4,150,255 | 4/1979 | Theis et al. | |
| 4,451,704 | 5/1984 | Winkelman | |
| 4,540,856 | 9/1985 | Fujii et al. | |
| 4,608,460 | 8/1986 | Carter et al. | 379/89 |
| 4,645,873 | 2/1987 | Chomet | 364/900 X |
| 4,654,482 | 3/1987 | DeAngelis | 379/91 X |
| 4,734,858 | 3/1988 | Schlafly | 364/900 X |
| 4,775,935 | 10/1988 | Yourick | 364/518 X |

FOREIGN PATENT DOCUMENTS

| | | |
|---|---|---|
| 60-152168 | 8/1985 | Japan ............ 379/88 |
| WO86/06901 | 11/1986 | PCT Int'l Appl. |
| 1397841 | 6/1975 | United Kingdom . |
| 1551791 | 8/1979 | United Kingdom . |

OTHER PUBLICATIONS

S. D. Hester et al., "The AT&T Multi-Mode Voice Systems-Full Spectrum Solutions For Speech Processing Applications", *Proceedings of the 1985 Avios Conference.*

"Nynex to Try Operator-Assisted Directory Assistance", *Boc Week*, Feb. 17, 1986, p. 9.

"DECtalk Speaks for Consolidated Data Processing Services", Straight Talk, Digital Equipment Corporation Newsletter, vol. 2, #1, pp. 1-2.

J. P. Moosemiller, "AT&T Conversant TM I Voice System", Speech Technology, Mar./Apr. 1986, pp. 88-93.

B. Stoffels, "Management Notes", *Telephone Engineer & Management*, Jun. 15, 1986, p. 17.

R. Blain, "Plant Man's Notebook-Telecom Canada Helps Revive 'The Real Thing'", *Telephony*, Sep. 16, 1985, p. 89.

*Telephone Directory for Naperville, Ill.*, Illinois Bell, Oct. 1986, Community Information Naperville Section, pp. 12-13.

(List continued on next page.)

Primary Examiner—Aristotelis Psitos
Assistant Examiner—James E. Tomassini
Attorney, Agent, or Firm—Werner Ulrich

[57] ABSTRACT

A vendor information service is offered utilizing the services of attendants for identifying customer requests and for taking orders, utilizing a voice processing unit for announcing prerecorded information to customers and for recognizing voice commands or keyed requests. Such commands or requests may be to announce another message to a customer, to set up a connection to a telephone operator, or to connect the customer directly to a vendor. A customer is initially connected to a telepone operator who ascertains the basic customer request. In response to that request, the operator sets up an announcement for the customer. A voice processing unit then monitors the customer for voice commands or keyed requests in order to play another announcement or to set up a connection from the customer to another telephone operator or a vendor attendant. Advantageously, such an arrangement utilizes operator and vendor attendant time efficiently and permits advertising announcements to be played only to those customers who specifically request them.

14 Claims, 8 Drawing Sheets

OTHER PUBLICATIONS

"Comp-U-Stone System Could Change Retail Economics"; Shelton et al., Direct Marketing, Jul. 1983 pp. 101–107.

"Videodisc"; Videodisc and Optical Disc, Jul./Aug. 1985; vol. 5, No. 4, pp. 244–247.

"Touchcom (TM) Interactive Videodisc Catalog Markets Furniture at Payton's ", pp. 343–345.

"Direct Marketing Goes Electronic"; Riggs, Sfmm/Jan. 14, 1985.

"Setting Up Shop on Computer Screens"; Gatty, Nation's Bussiness, Mar. 1984, pp. 57–58.

N. X. DeLessio et al., "An Integrated Operator Services Capability for the 5Ess TM System", ISS '84, Session 22C, Paper 3, (Florence), May 7–11, 1984, pp. 1–2.

SEMI-AUTOMATED CUSTOMER INFORMATION SYSTEM

TECHNICAL FIELD

This invention relates to methods and apparatus for telemarketing, and specifically providing vendor information services in response to telephone customer initiated inquiries.

PROBLEM

Telemarketing, i.e., the use of telecommunications systems for sales purposes, is widely used by retailers, wholesalers, or, more generally, vendors for selling services and equipment and for providing customer information with respect to such sales. A vendor-provided automatic call distributor (ACD) typically connects customers calling that vendor to one of a group of attendants who accept orders and/or provide customer information to the caller.

The type of customer initiated telemarketing wherein a customer is invited to call a vendor based on advertising in the public media is inefficient and costly since each advertisement reaches many uninterested individuals for every true prospective customer. Because advertising frequently provides incomplete information, many customers call a vendor even though they do not want a vendor product or service. Even for customers who want to make a purchase, large amounts of attendant time are frequently required to identify the customer's needs specifically. Further, a vendor-provided ACD must be staffed to process peaks of customer telephone traffic or risk the loss of a potential sale, thus making inefficient use of attendants. Effective present customer-initiated telemarketing arrangements typically are highly labor intensive and therefore costly. A problem of the prior art therefore is that these systems waste large amounts of vendor attendant time to identify customer needs and to provide continuous communications with customers.

SOLUTION

The aforementioned problem is solved and a technical advance is achieved in the art by virtually eliminating the need for continuous operator involvement on vendor incoming calls by having the operator route such calls to a voice processing unit to receive announcements on vendor services or products and to detect on an information or voice processing system, commands, such as voice or customer station tone signals, for connection to a vendor or another operator for further call assistance or order taking. This arrangement allows a customer to communicate with attendants, but uses attendants only for those functions which are likely to be performed inadequately by automatic equipment.

A customer may make a positive response to an announced offer for a connection to an attendant for one of a plurality of vendors selected by the customer command, detected by the voice processing unit. The connection process is thereafter initiated by the control processor of the telecommunications system. Advantageously, customers who make such requests are customers for whom time of the vendor attendant can be efficiently devoted. Advantageously, this service may be offered without charge to customers, and a vendor will only pay on a per call basis for calls from such good prospects and need not incur the expense of receiving a large number of direct calls from uninformed customers. Since the calls are customer-initiated and have been initially categorized by a general attendant, a vendor attendant is connected only when a customer is likely to need a product, service, or vendor information. In other cases, a positive response can cause a customer to be connected to another attendant to obtain further information. Such an arrangement is usable to categorize customer requests and effectively to screen calls before connecting customers to a vendor attendant.

Initially, the general attendant selects a prerecorded announcement from a plurality of such announcements on different vendor products or services. The selection is used to provide a customer with one category of information as requested, and allows a general attendant to serve requests for many such categories.

A single telephone number is illustratively used to reach an initial operator who can respond to requests for a large variety of products and services. Advantageously, such an arrangement permits a single large group of attendants or operators to service inquiries for many vendors. For example, if one vendor has a particularly attractive sale, the single large group is likely to be able to absorb the extra traffic from that sale without requiring the vendor temporarily to increase its staff and telephone facilities. Further, customers need only remember one number in order to get information on a large variety of products and services.

In one embodiment of the invention, the operators or attendants responding to the initial request and the operators or attendants responding to the follow-on requests are illustratively segregated into different groups. Operators or attendants may then be selected for each group according to experience and sales ability, and trained to meet the special requirements of each type of activity.

The command by a customer that is recognized by the voice processing unit is illustratively a voice command, spoken by a customer, or a number, keyed by a customer having, for example, a dual tone multifrequency (DTMF) customer station. Such command inputs are readily supplied by a customer and readily recognized by a voice processing unit.

A general attendant illustratively has access to one or more remote data bases to provide the customer with information about a broad range of vendors, and provide regional and local vendor data.

DRAWING DESCRIPTION

FIG. 1 is a block diagram of a switch for offering vendor information services, and customer, attendant, and data base connections to such a switch; the switch, a data base interconnecting network and a remote data base are shown with heavy outlines to indicate that the changes required for implementing this invention are concentrated in these blocks; and FIGS. 2–10 are flow diagrams of program controlled actions and customer and attendant actions for offering vendor information services.

DETAILED DESCRIPTION

Figure 1:
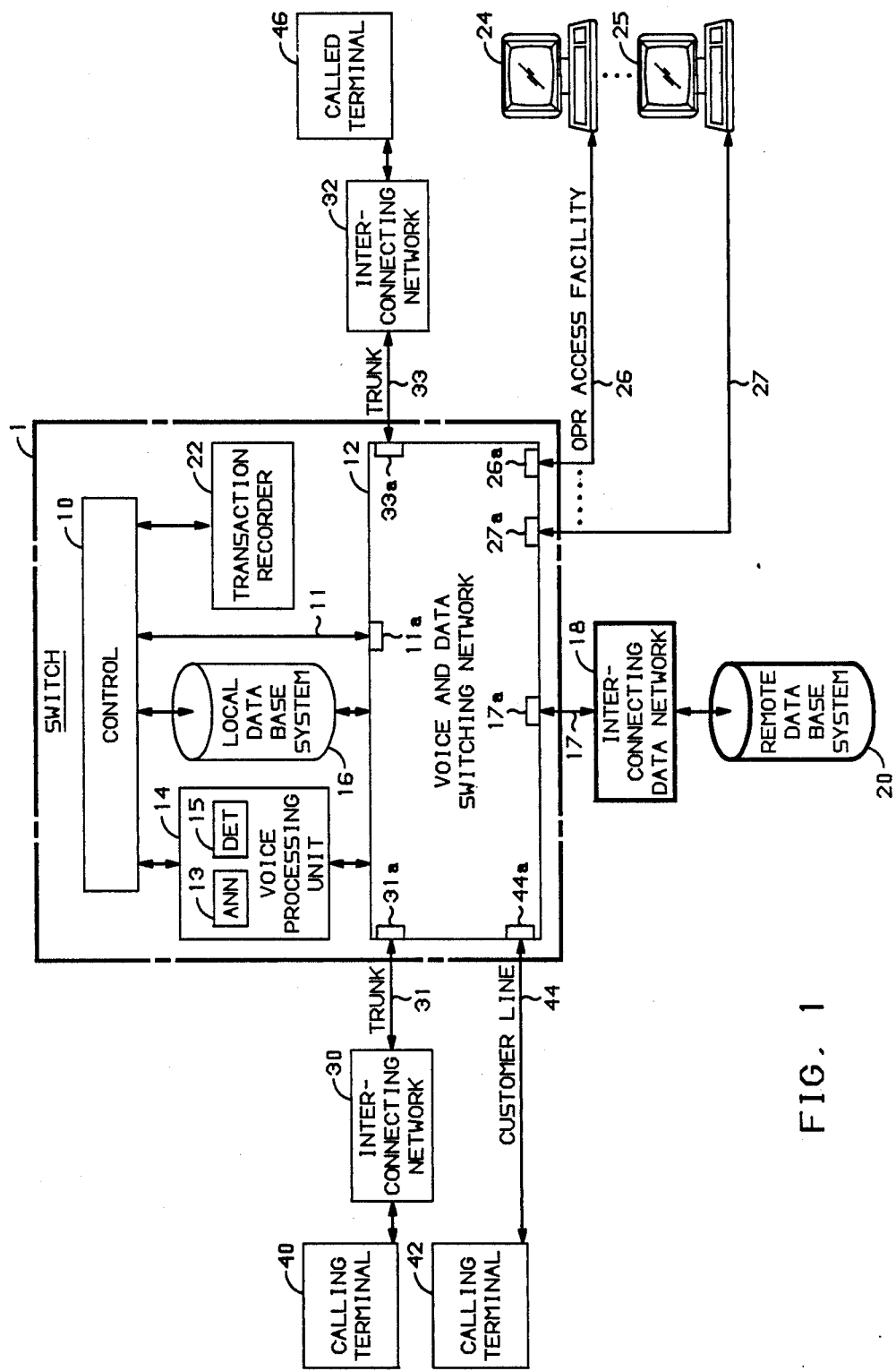

FIG. 1 is a block diagram of an exemplary embodiment of the invention, in this example, for offering a service tentatively designated "800 consumer service". 800 consumer service is a service whereby customers who call a single 800 number, for which they are not charged, are connected to a shared system for providing information about a large variety of consumer products and services, available from many different vendors, in accordance with the principles of this invention. Switch 1 is a stored program controlled telecommunications switching system such as the 5ESS ™ switch manufactured by AT&T Technologies, Inc. The switch comprises a distributed control 10 used for controlling a voice and data switching network 12. Control 10 accesses network 12 at port 11a via data channel 11. The network has input ports for connection to communication links. The voice and data switching network are used to interconnect input communication links such as customer line 44, trunks 31 and 33, and output communication links such as operator access facilities 26 and 27 connected to operator or attendant positions 24 and 25, and data link 17. These links are connected to input ports 44a, 31a, 33a, 26a, 27a, and 17a for interconnection by the network 12. In addition, for this application, the voice and switching network interconnects such facilities with a voice processing unit 14. The voice processing unit is used for generating voice messages to be sent to telecommunications customers and is used for analyzing non-supervisory signals representing customer commands; signals include voice commands from such customers and dual tone multifrequency (DTMF) signals keyed from customer stations. The voice processing unit 14 includes announcement circuits 13 and detection circuits 15, both controlled by a controller of voice processing unit 14. In alternate configurations, the announcement and detection circuits could be separate and separately controlled. In addition, the voice and data switching network 12 is connected to a local data base system 16 in order to permit, for example, the operators at operator positions 24 and 25 to access such a local data base.

A voice processing unit such as the Conversant ™ 1 Voice System, Model 80, manufactured by AT&T Technologies, Inc., is one unit which can carry out the functions of voice processing unit 14. Other information processing systems can be used with other types of customer terminals to handle other types of customer command signals such as data signals.

A customer such as a customer at calling terminal 42 which is directly connected to switch 1 by customer line 44 can directly access the voice and data switching network 12. Other customers such as the customer at calling terminal 40 connected by a public interconnecting network 30 to trunk 31 access switch 1 through trunk 31. Switch 1 accesses called terminals not directly connected to that switch through trunk 33 and interconnecting network 32.

Assume that a customer at calling terminal 40 wishes to use 800 consumer service. The customer dials the nationwide 800 number required to access the service and is connected through interconnecting network 30 and trunk 31 to switch 1 which offers the 800 consumer teleservice to a region. The customer is then connected through voice and data switching network 12 and operator access facility 26 to an operator at operator position 24. The operator communicates with a customer and ascertains the type of information that the customer wants. The operator either gives the customer that information directly or arranges that the customer receives an announcement providing this information. The announcement is generated by voice processing unit 14 which is then connected to trunk 31 by voice and data switching network 12. The voice processing unit generates this announcement on the basis of data provided by the local data base system 16 and transmitted from local data base 16 via voice and data switching network 12 to the voice processing unit 14.

After the customer has received the announcement, the customer may disconnect or may wish to make further inquiries. Part of the announcement is a prompting request to the customer to indicate either by pressing a key of a DTMF station or by saying an appropriate command such as "yes" that the customer is to be reconnected to an attendant. The operator or attendant to whom the customer will be reconnected will not be, in general, the same attendant with whom the customer first communicated; however, that attendant will have a display indicating the announcement received by the customer and a menu display of the kinds of actions that can be undertaken further. These actions include a connection to one of a group of suppliers of equipment or services, an indication that the attendant can enter data into a data base to have a brochure mailed to the customer or that the attendant can either directly take an order or can request information for a survey. In case the attendant takes an order or receives information for a survey, the attendant keys this information for storage into a data base, which may be local data base 16 or remote data base 20, for subsequent transmission to the supplier. This information is sent via the data communication facilities of the public switched network.

If one of the actions on the menu is to connect the customer to the supplier, and the operator ascertains from communications with the calling customer that the customer wishes to be so connected, the attendant signals to the control 10 to set up a connection from trunk 31 to the supplier at, for example, called terminal 46 via trunk 43 and interconnecting network 32. Advantageously, the call can be billed to the supplier, without requiring that the calling customer know an 800 number for reaching the called terminal. The directory number actually used for accessing the called terminal may be a special number to identify calls from customers who have already been screened by the attendant who supplied the 800 consumer service.

FIGS. 2-10 are flow charts of programs executed by control 10 to implement 800 consumer/800 business service. The service is called 800 consumer/800 business because different directory numbers are used for accessing consumer and business products and services. Otherwise the two services are essentially identical; only 800 consumer service is discussed in this description.

The operators are grouped into two teams, the first or A team being used primarily for initial contacts with the customer and the second or B team being used primarily for additional contacts with a customer. The B team, for example, would take orders or forward the call to a supplier or sponsor or to a terminal or terminal group designated by the sponsor, such as an order taking telemarketing service. The members of the B team might have more training in the techniques of retrieving the more specialized data that may be required for handling the more detailed requests of customers who have already received their first sponsor message. If either team is overloaded, calls for that team can overflow to the other team.

Figure 2:
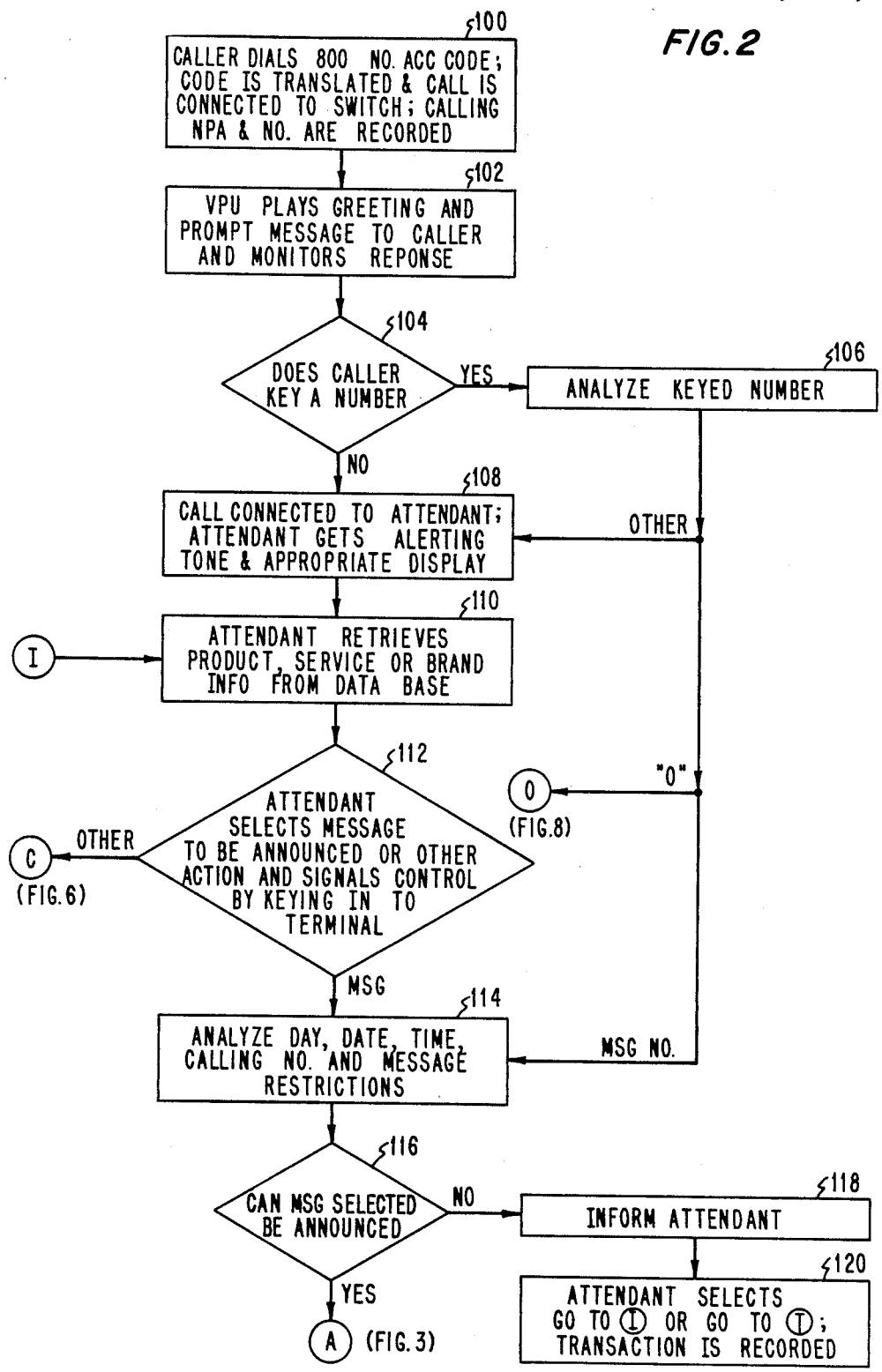

FIG. 2 is a flow chart of initial actions performed when a calling customer or caller dials the 800 consumer number. This number is translated in the local switching system or switch to which the calling customer's terminal is connected. In response to the translation, a connection is set up through interconnecting network 30 from the calling terminal 40 to the voice and data switching network 12 of switch 1. The caller's directory number, including the numbering plan area code, is forwarded to switch 1 and is stored in the memory of control 10 for eventual recording by transaction recorder 22, used for recording data for billing and traffic analysis purposes (action block 100, FIG. 2). The voice processing unit 14 is connected to the caller and is programmed to play a greeting and prompt message to the caller (action box 102). The voice processing unit 14 then monitors the caller's response to see if the caller keys a number (decision block 104). If the caller keys such a number, this number is analyzed (decision block 106). Thereafter, the voice processing unit is disconnected from the caller. If the caller has keyed a zero, this is a request to be connected to an operator of the B team for subsequent processing as described hereinafter with respect to FIG. 8. If the caller keys a message number (action box 107) the caller is connected to the message corresponding to the message number as further described hereinafter with respect to action box 114. The caller might have been informed of the message number through an advertisement. If the caller does not key a number, the caller is connected to an attendant of the A team. That attendant gets alerting tone and a display indicating that this is the caller's initial contact with an attendant and indicating the directory number of the caller in order to give the operator an indication of the origin of the call. If desired, the geographic location associated with that directory number may also be displayed or may be displayed instead of the directory number.

After the attendant has communicated with a caller, the attendant retrieves information about the product, service, or brand requested by the caller from a data base. In general, this is likely to be the local data base 16 which stores data for national as well as local items. If the customer requests data about local items from a remote location, then remote data base 20 is accessed via interconnecting data network 18. The second situation is especially likely during periods of light traffic when many of the switches serving 800 consumer calls are likely to be closed down for the night.

Figure 3:
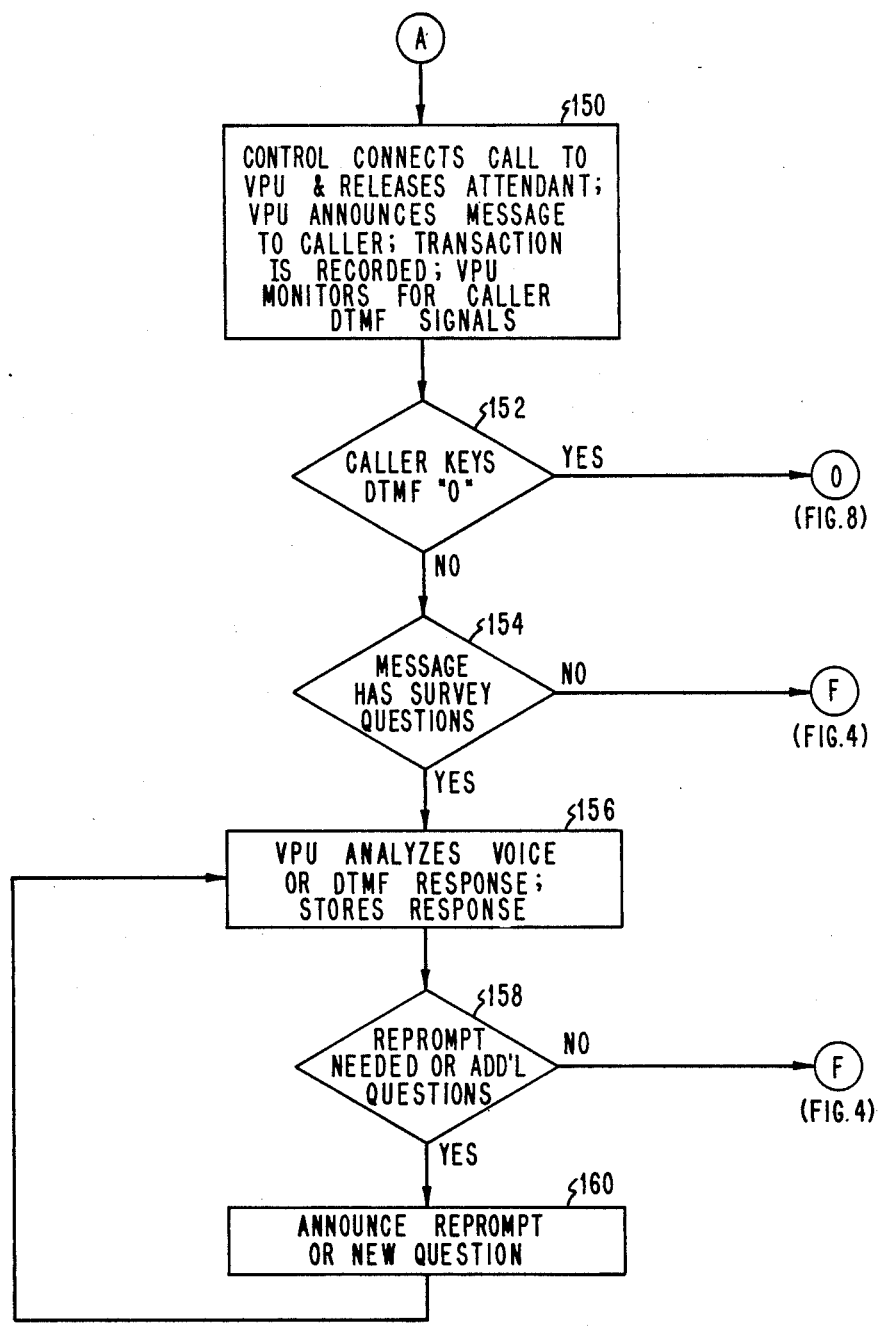
Figure 6:
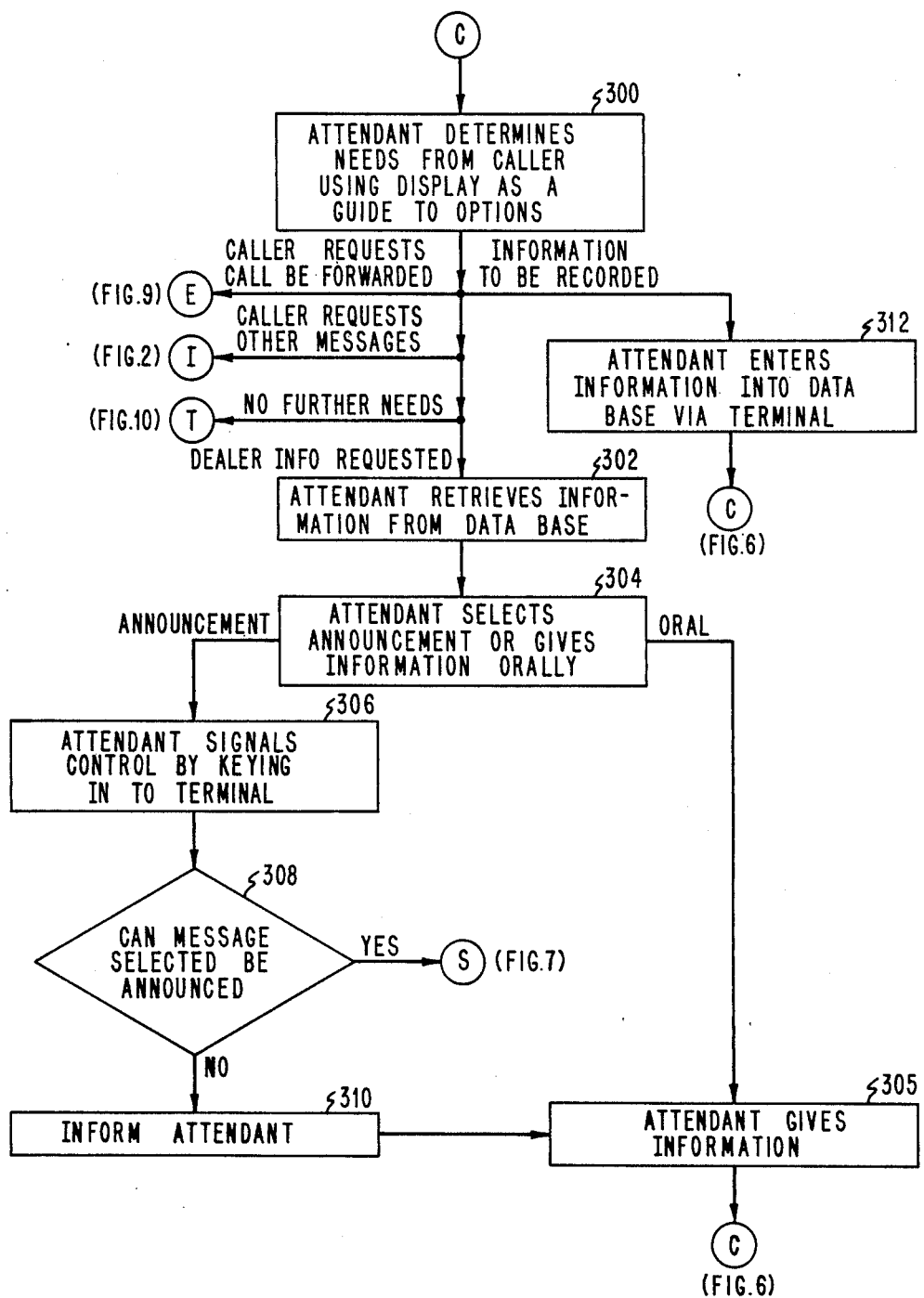

Based on the information displayed to the attendant, the attendant selects (decision block 112) a message to be announced to the customer, or selects among other options to be carried out (such as simply disconnecting the call) as described further with respect to FIG. 6. If the tentative decision is that a message is to be announced to the customer, then the day, date, time, calling number, and message restrictions associated with this message are first analyzed (action block 114). If the selected message can be announced, then further actions described with respect to FIG. 3 are executed. If the message cannot be announced, the attendant is informed (action box 118) and the attendant either makes further inquires of the data base (action block 110 previously described) or initiates call termination actions described further with respect to FIG. 10. In order to bill the sponsors appropriately, the transaction is recorded on transaction recorder 22. A decision that the selected message cannot be announced may be based on the fact that the message, for example, for a sale, cannot be announced before or after a certain time or that the sponsor is unwilling to have the message announced to customers outside of a given area.

The message may be prerecorded in total or may have one or more segments, such as a number, announced in the middle of a prerecorded message, or may consist of several prerecorded segments. The choice among these possibilities is made based on data keyed by the attendant and passed to the announcement system.

Figure 4:
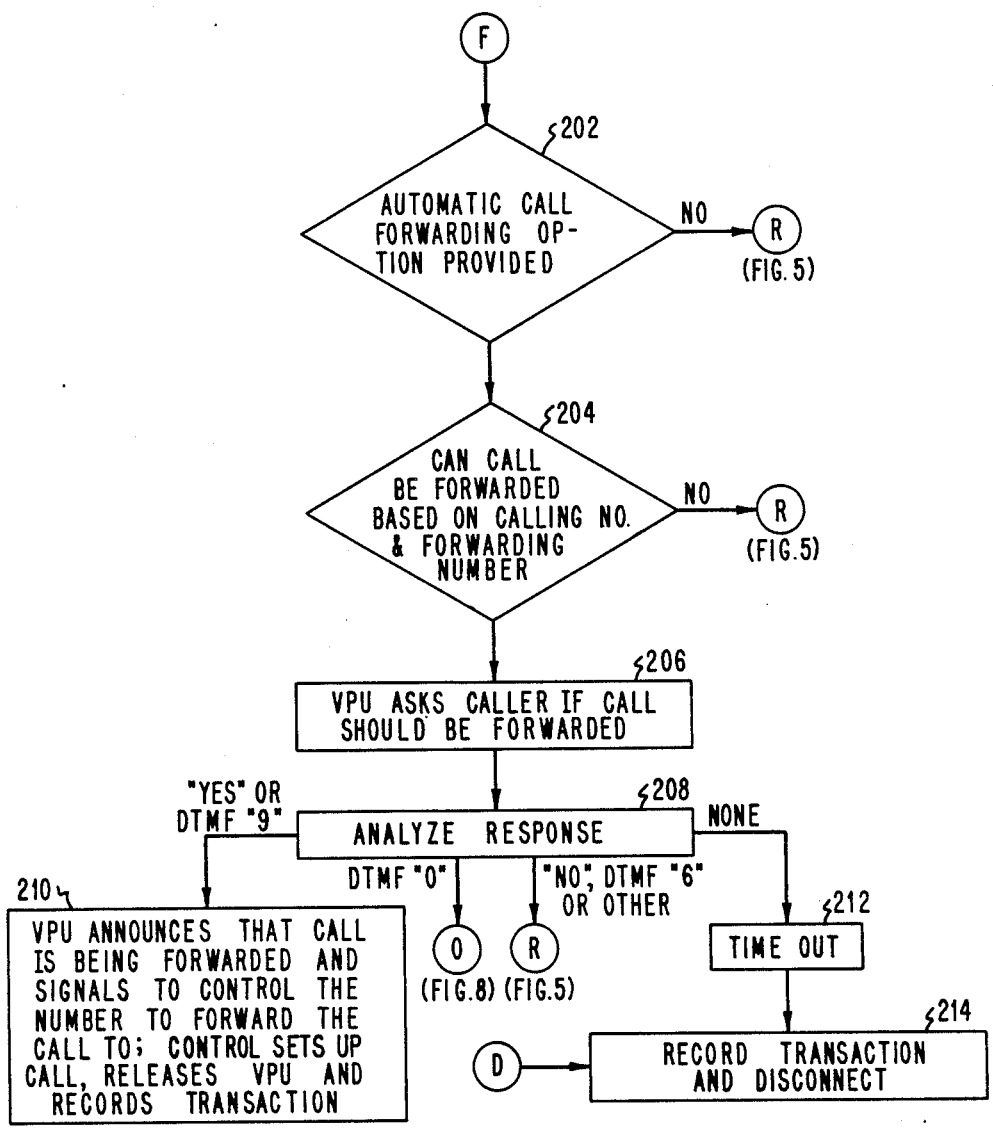

FIG. 3 is a flow chart of the program for controlling actions performed with respect to the announcement of a selected message. Control 10 connects the caller to voice processing unit 14 through the voice and data switching network 12 and releases the connection from the caller to the attendant. The voice processing unit then announces the message to the caller. The transaction is recorded on transaction recorder 22 in order to bill the appropriate sponsor. The voice processing unit monitors for caller keyed DTMF signals throughout the announcement (action box 150). If the caller keys a zero then the caller is connected to an attendant of the B team as described further with respect to FIG. 8. If the caller has not keyed a zero, a test is made whether the message has an associated survey question (decision block 154). If not, the actions associated with forwarding of the call to a sponsor selected facility or reconnecting the caller to another attendant as discussed with respect to FIG. 4 are carried out. If the message has survey questions, then the voice processing unit analyzes the voice or keyed response requested by the recorded message and stores that response for recording in the data base for subsequent analysis and/or transmission to a sponsor (action block 156). Next, a test (decision block 158) is made whether a reprompt is needed because no response has been received from the caller or whether additional questions need to be asked. If so, the reprompt or new question is transmitted (action box 160) and a new analysis of the voice or DTMF response as previously described with respect to action box 156 is made. If no reprompt is needed and no additional questions are to be asked, then the actions described hereinafter with respect to FIG. 4 are carried out.

Additional questions may be based on the caller's response. While this has not been shown in the flow charts in order to allow the flow charts to describe the more basic aspects of the present invention, it is clear that arrangements can be programmed by those of ordinary skill in the art to have a complex tree structure for asking additional survey questions in response to specific survey responses. In this embodiment of the invention, the DTMF signal corresponding to a spoken "yes" is "9" (selected because the Y is on the 9 key). Similarly the key equivalent to spoken "no" is "6" (selected because N is on the 6 key). Clearly, other choices could be made. However, in reading the flow charts of this specification, this convention should be observed. Similarly, a keyed zero is generally a request to be connected to an operator.

Figure 5:
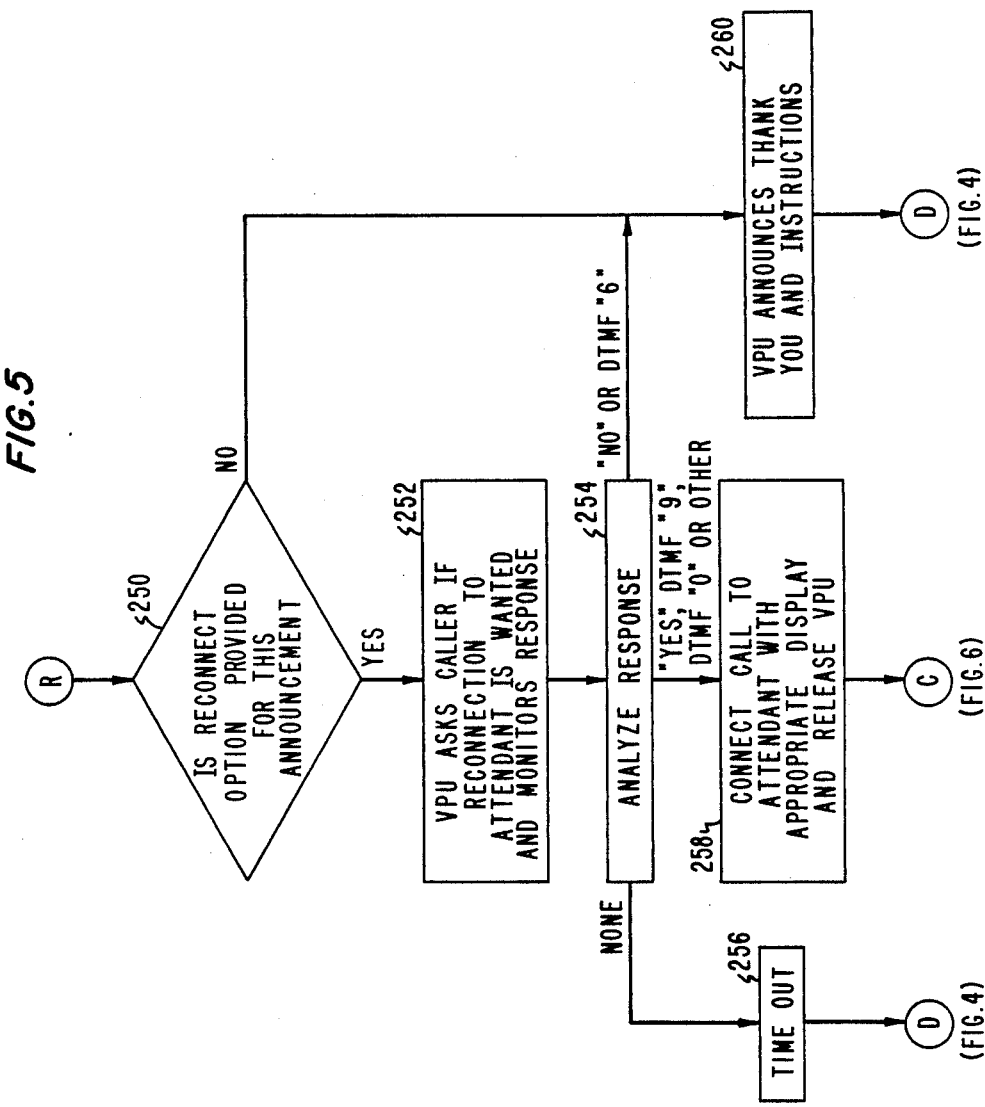

FIG. 4 describes the actions performed after a caller has heard a basic sponsor or vendor message and has responded to any survey questions. First, a test is made (decision block 202) whether an option is provided for forwarding the call to a sponsor designated facility without reconnecting an operator. If that option is not provided, then the actions performed with respect to FIG. 5 dealing with reconnection to an operator are performed. If the call forwarding option without reconnection to an operator is provided, then test 204 checks whether the call can be forwarded to the sponsor designated facility. This test is based on the calling number and the number of the sponsor designated facility. For example, a sponsor may indicate that calls can be forwarded without the intervention of an operator only if they originate in a certain region as identified by the calling number. If test 204 indicates that the call cannot be forwarded without reconnecting an operator, then the actions described with respect to FIG. 5 are executed. If test 204 indicates that the call can be forwarded without reconnecting an operator, then the VPU 14 announces a question to the caller asking if the call should be forwarded (action box 206). The response to this question is analyzed in decision block 208. If there is no response within a timeout interval (action box 212) then the transaction is simply recorded and the caller is disconnected (action box 214). If the caller says "no", keys DTMF "6" or either keys or says anything else other than the "yes" or the zero signals, then the actions carried on with respect to FIG. 5 for possible reconnection to an operator are executed. If the caller keys a zero, then an attendant of the B team is connected to the customer as described below with respect to FIG. 8. If the customer says "yes" or keys a DTMF "9", then the actions shown in action box 210 are performed. VPU 14 announces to the caller that the call is being forwarded and signals to control 10 the number to which the call is to be forwarded. This is the number of the sponsor designated facility. Control 10 then controls the setup of the call to that number, releases the VPU 14 and records the transaction in transaction recorder 22.

FIG. 5 describes the actions executed in response to a request to be reconnected to an operator. Test 250 checks whether the reconnect option is provided for the announcement just completed. If so, VPU 14 announces to the caller a question asking whether a reconnection to an attendant is wanted and monitoring the customer's response (action block 252). Decision block 254 analyzes the customer's response. If the customer does not make any response within a predetermined time limit as detected in action block 256, then the disconnect actions previously described with respect to action block 214 (FIG. 4) are carried out. If the customer keys a DTMF "9" (equivalent to yes), says "yes", or keys a zero, then the calling customer is connected to an attendant of the B team with an appropriate display and the voice processing unit is released (action box 258). The display indicates to the attendant the announcement given to the customer and the options available to the attendant (such as forwarding the call to a sponsor designated facility directly, taking an order, asking a survey question, or a list of followup announcements selectable by the attendant in response to further discussion with the calling customer). If the customer's response is "no" or the keyed "6", the VPU 14 announces a "thank you" and, if necessary, any further instructions specified by the sponsor of the announcement (action box 260, FIG. 5). Subsequently, the customer is disconnected as previously described with respect to action block 214 (FIG. 4). Action block 260 is also executed if the reconnect option is not provided for this announcement (negative result of test 250, previously described).

FIG. 6 is a flow chart of actions performed in connection with further transactions on a particular call after the caller has already received the initial announcement. In test 300, the attendant determines further needs from the caller using the display described previously with respect to action block 258 (FIG. 5) as a guide to options available. If the caller requests other messages then the actions performed with respect to action block 110 (FIG. 2) are carried out and the customer effectively receives a new initial announcement. If the caller requests the attendant to forward the call, then the actions performed with respect to FIG. 9 described hereinafter are performed. If the caller indicates that there is no need for further information, then the actions described in FIG. 10 are performed. If the caller needs additional information about vendors or dealers for the desired product, then the attendant retrieves such information from the data base (action box 302). Based on the display generated for the attendant, the attendant makes a decision (decision block 304) and either selects an announcement concerning vendors or dealers (action block 306) or simply gives the information orally to the caller (action block 305). Thereafter, decision block 300 is reentered in case the customer needs further information. An oral exchange would be used if the caller needs some item of specific data such as schedule information, price information, or if the exchange is likely to lead to a specific order by the customer.

If an announcement is more appropriate, the attendant signals to the control of the system by keying the number of the announcement into the terminal (action box 306). Announcements are more appropriate if the information being given to the caller does not require a two-way communication between the caller and the attendant. Examples of such information include a specific vendor or dealer's address and telephone number, or another more specific advertisement.

Before the selected message is announced, a test is made (test 308) to see if the sponsor is willing to have this message announced to a caller. If not, the attendant is informed (action box 310), the attendant gives information (action block 305) and decision block 300 is reentered in order to allow the attendant to further interact with the caller. If the selected message can be announced, then the program described in the flow chart of FIG. 7 is executed.

If the attendant determines that information is to be recorded, for example, that the caller wishes to order a particular item, then the attendant enters this information into a data base via the attendant's terminal (action box 312). This data base can be the local data base 16 or the remote data base system 20, depending on the needs of the sponsor as displayed to the attendant based on data associated with previously requested announcements or other data obtained by the attendant. Decision block 300 is then reentered to see if the caller needs any further information.

Figure 7:
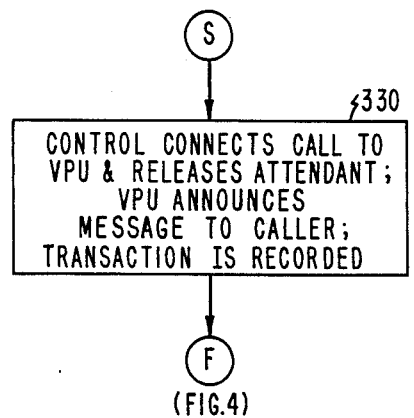

FIG. 7 is a flow chart of the program (action block 330) which is executed when a customer is connected to a second or subsequent announcement. The control connects the customer to VPU 14 and releases the attendant. VPU 14 announces the message to the caller. The transaction is recorded on transaction recorder 22 in order to bill the appropriate sponsor. Thereafter, the actions previously described with respect to FIG. 4 are performed.

Figure 8:
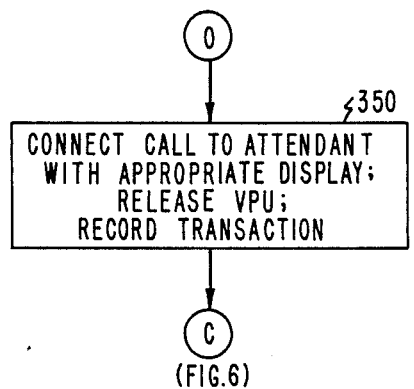

FIG. 8 is a flow chart of the actions (action block 350) performed when the caller is reconnected to an attendant. The attendant receives an appropriate display indicating data about the previous message announced to the customer and a menu of appropriate actions to be carried out by the attendant thereafter. VPU 14 is released and the transaction is recorded on transaction recorder 22 in order to bill the appropriate sponsor. Thereafter, the actions described with respect to FIG. 6 are performed. Action box 350 is also entered if the customer keys zero immediately after receiving the greeting and prompt message with respect to action block 102 (FIG. 2). In that case, the display will not indicate any sponsor message but will simply indicate that the customer requested connection immediately after receiving the prompt message.

Figure 9:
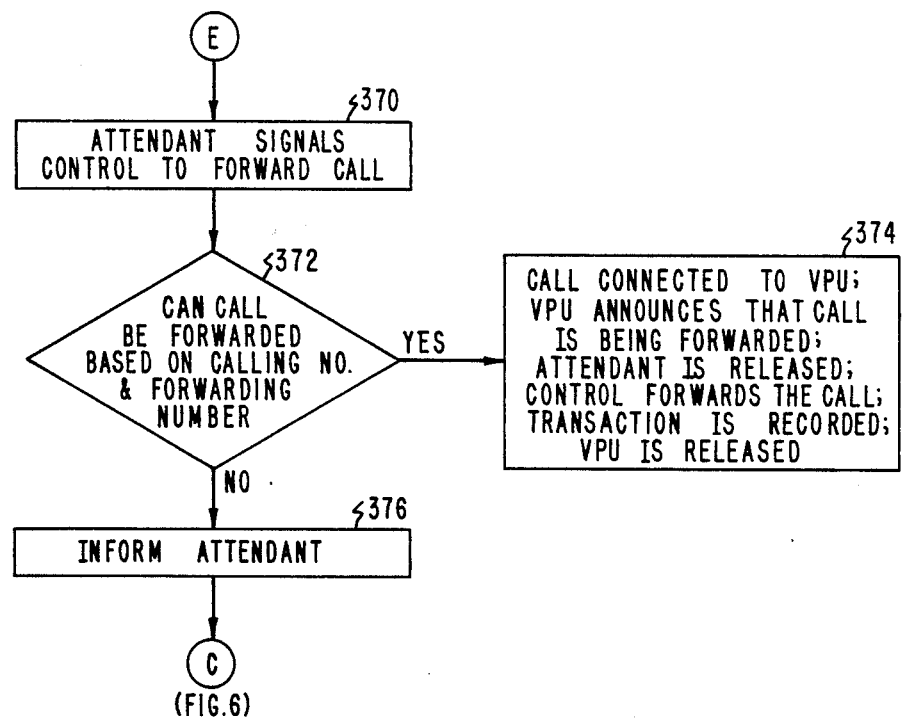
Figure 10:
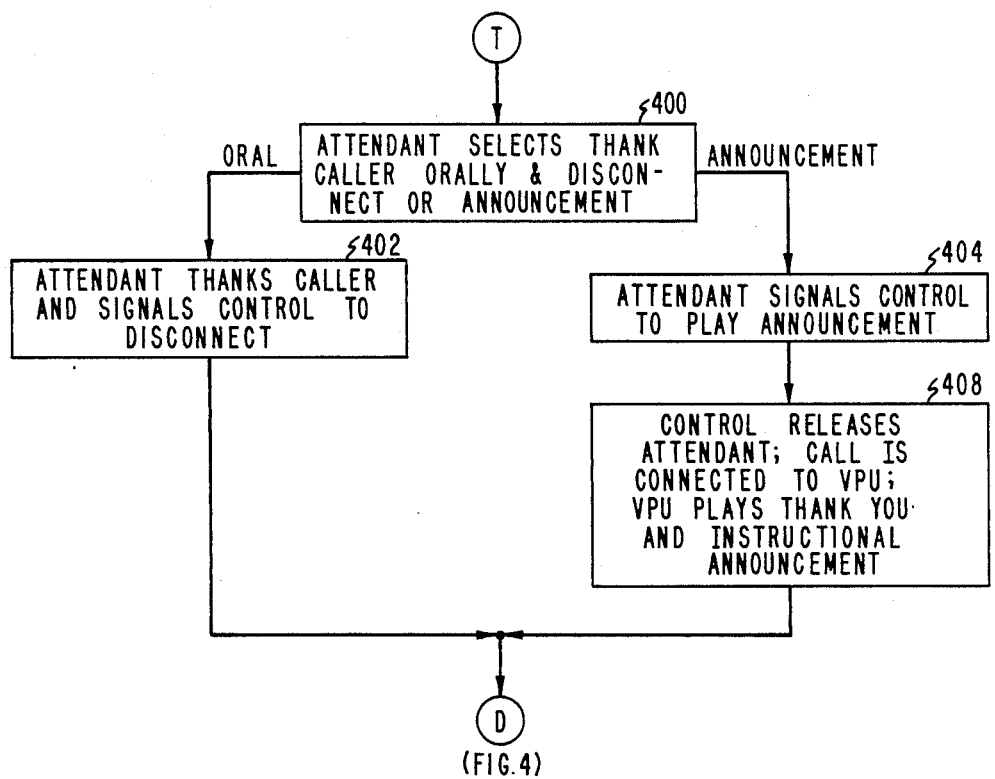

FIG. 9 is a flow chart of actions performed when an attendant signals the system to forward the call to a sponsor designated facility. The attendant signals control 10 to forward the call to the sponsor designated facility (action box 370). Test 372 checks whether the call can be forwarded based on the calling number and the sponsor designated facility number. If not, the attendant is informed (action box 376) that the call cannot be forwarded and the actions performed with respect to FIG. 6 are performed. (The attendant interacts with the caller to determine further needs.) If the call can be forwarded (action box 374), then the call is connected to the VPU 14 which announces to the caller that the call is being forwarded. The attendant is released and the control 10 controls the setup of a connection between the calling customer and the sponsor designated facility. The transaction is recorded on transaction recorder 22 in order to bill the appropriate sponsor, and voice processing unit 14 is released. A factor which may affect the decision of whether a call can be forwarded (test 372, FIG. 10, and test 204, FIG. 4) is the time of day, the day and the date. A sponsor designated facility is not likely to be staffed 24 hours a day, seven days a week, and a sponsor would not want to have this facility receive calls when the facility is unstaffed. Under those circumstances, it would be appropriate to give the caller an announcement indicating when the facility is staffed so that the calling customer can complete the transaction at a later date or time.

FIG. 10 is a flow chart of the actions performed in terminating a call. The attendant selects between the options of thanking the caller orally and disconnecting or connecting the customer to an appropriate announcement. If the decision is made to take the oral route, then the attendant thanks the calling customer and signals control 10 to disconnect the call (action block 402). Subsequently, the actions previously described with respect to FIG. 4, action block 214 are carried out. If the attendant chooses to connect the customer to an announcement, the attendant signals control 10 to cause the announcement to be played to the customer (action block 404). The control 10 releases the attendant and the call is connected to VPU 14. VPU 14 then plays a thank you announcement and a general instructional announcement to the customer that if further information is desired the customer can call the consumer 800 number. Subsequently, the disconnect actions previously described with respect to action block 214 (FIG. 4) are executed.

It is to be understood that the above description is only one preferred embodiment of the invention. For example, the system described can be used to service a single large vendor offering a broad variety of services and/or products. Also, whereas in this example, calls to the vendor attendants are set up from the switch serving the operators, such a connection could be set up from the local switch serving a calling terminal by sending a call setup request message, for example by well-known common channel signaling techniques, to the local switch serving the calling customer. Numerous other arrangements may be devised by one skilled in the art without departing from the spirit and scope of the invention. The invention is thus limited only as defined in the accompanying claims.

What is claimed is:

1. A method of providing information to a telecommunications customer at a customer station in a telecommunications system comprising a switch including a voice processing unit, said voice processing unit also adapted to detect signals keyed on a customer station, comprising the steps of:

dialing a directory number from a customer station, said directory number used for accessing attendants;

setting up a first call connection from said customer station to a first attendant position selected from a first group of attendant positions;

responsive to an information request received over said first call connection, selecting one of a plurality of prerecorded messages, at least one of said plurality of messages comprising a prompting message specifying a customer command to be generated at said customer station;

transmitting said selected prerecorded message to said customer station;

the method CHARACTERIZED IN THAT it includes the additional steps of:

after the beginning of the transmitting step detecting a customer command transmitted from said customer station, by said voice processing unit, wherein said customer commands comprise spoken commands and signals keyed on a customer station;

in response to detection of a first customer command, setting up a second call connection in said switch between said customer station and a telecommunications terminal serving a vendor, and billing said vendor for said second call connection.

2. The method of claim 1 further comprising the steps of:

in response to the detection of a second customer command, setting up a third call connection from said customer station to a second attendant position selected from a second group of attendant positions.

3. The method of claim 2 further comprising the step of:

responsive to a customer request received over said third connection, setting up a fourth call connection between said customer station and a communication terminal serving a vendor and billing said vendor for said fourth call connection.

4. The method of claim 3 further comprising the steps of:

accessing a remote data base from said second attendant position;

displaying data obtained from said remote data base at said second attendant position; and communicating information based on said displayed data to said customer station.

5. The method of claim 1 further comprising the step of:

in response to the detection of a fourth customer command, recording data corresponding to said fourth customer command.

6. The method of claim 1 further comprising the steps of:

prior to setting up said first call connection, setting up a connection between said customer station and said voice processing unit to detect customer command signals representing a preliminary command; and responsive to detection of customer command signals representing a preliminary command, transmitting another prerecorded message to said customer station.

7. The method of claim 1 wherein said selecting step is CHARACTERIZED IN THAT it comprises the steps of:

responsive to an information request received over said first connection, accessing a remote data base from said first attendant position displaying data obtained from said remote data base at said first attendant position; and selecting one of a plurality of precorded messages in response to data displayed at said first attendant position.

8. In a telecommunications system comprising a switch including a voice processing unit, a method of providing information to a telecommunications customer at a customer station comprising the steps of:

dialing a directory number from a customer station, said directory number used for accessing attendants for providing customer information for a plurality of vendors;

setting up a first call connection from said customer station to a first attendant position selected form a first group of attendant positions;

responsive to an information request received over said first call connection, selecting one of a plurality of prerecorded messages, at least one of said plurality of messages comprising a prompting message specifying a customer command to be generated at said customer station;

transmitting said selected prerecorded message to said customer station;

after the beginning of the transmitting step detecting customer commands, transmitted from said customer station, by said voice processing unit, wherein said customer commands comprise spoken commands and signals keyed on a customer station;

in response to detection of a first customer command, setting up a second call connection in said switch between said customer station and a telecommunications terminal serving a vendor, and billing said vendor for said second call connection;

in response to the detection of a second customer command, setting up a third call connection from said customer station to a second attendant position selected from a second group of attendant positions;

displaying data identifying said selected prerecorded message on a terminal of said second attendant position;

responsive to a customer request received over said third connection, setting up a fourth call connection between said customer station and a communication terminal serving a vendor under the control of said second attendant position and billing said vendor for said fourth call connection; and in response to the detection of a fourth customer command, recording data corresponding to said fourth customer command.

9. The method of claim 8 further comprising the steps of:

prior to setting up said first call connection, setting up a connection between said customer station and said voice processing unit to detect customer command signals representing a preliminary command; and responsive to detection of customer command signals representing a preliminary command, transmitting another prerecorded message to said customer station.

10. The method of claim 8 wherein said selecting step comprises the steps of:

responsive to an information request received over said first connection, accessing a remote data base from said first attendant position displaying data obtained from said remote data base at said first attendant position; and selecting one of a plurality of prerecorded messages in response to data displayed at said first attendant position.

11. The method of claim 8 further comprising the steps of:

accessing a remote data base from said second attendant position;

displaying data obtained from said remote data base at said second attendant position; and communicating information based on said displayed data to said customer station.

12. A method of providing information to a telecommunications customer at a customer station in a telecommunications system comprising a switch including a voice processing unit, said voice processing unit also adapted to detect signals keyed on a customer station, comprising the steps of:

responsive to receipt of a directory number from a customer station, setting up a first call connection from said customer station to a first attendant position selected from a first group of attendant positions;

responsive to an information request received over said first call connection, selecting one of a plurality of prerecorded messages, at least one of said plurality of messages comprising a prompting message specifying a customer command to be generated at said customer station;

transmitting said selected prerecorded message to said customer station;

the method CHARACTERIZED IN THAT it includes the additional step of:

after the beginning of the transmitting step, in response to detecting one of a plurality of customer commands transmitted from said customer station, said customer commands comprising spoken commands and signals keyed on a customer station, setting up a second call connection in said switch between said customer station and a telecommunications terminal serving a vendor, and billing said vendor for said second call connection.

13. In a telecommunications system comprising a switch including a voice processing unit, a method of setting up connections to provide information to a calling terminal, comprising the steps of:

setting up a first call connection between said calling terminal and a first attendant position;

routing said first call connection from said calling terminal to said voice processing unit;

responsive to an information request received over said first call connection, transmitting a prerecorded message, selected on the basis of signals from said first attendant position, from said voice processing unit to said calling terminal;

subsequently, said voice processing unit detecting a command from said calling terminal;

setting up a second call connection from said calling terminal to a second attendant position; and in response to said detecting of said command, displaying data identifying said message on a display terminal of said second attendant position;

wherein said step of transmitting a prerecorded message comprises the steps of:

responsive to said information request, accessing a remote data base from said first attendant position;

displaying data obtained from said remote data base at said first attendant position; and selecting one of a plurality of prerecorded messages in response to signals from said first attendant position generated in response to said data displayed at said first attendant position.

14. The method of claim 13 further comprising the step of:

dialing a directory number used from said calling terminal, said directory number used for accessing said first attendant position for providing information for a plurality of vendors.

* * * * *

UNITED STATES PATENT AND TRADEMARK OFFICE
CERTIFICATE OF CORRECTION

PATENT NO. : 4,943,995

DATED : July 24, 1990

INVENTOR(S) : Abraham N. Daudelin, Ronald J. Hartnett, William A. O'Connell

It is certified that error appears in the above-identified patent and that said Letters Patent is hereby corrected as shown below:

Claim 4, column 10, line 51, delete "3" and substitute --2--.

Claim 8, column 11, line 27, delete "form" and substitute --from--.

Claim 14, column 14, line 9, delete "used".

Signed and Sealed this

Twenty-fourth Day of December, 1991

Attest:

HARRY F. MANBECK, JR.

Attesting Officer

Commissioner of Patents and Trademarks